(12) United States Patent
Viaux et al.

(10) Patent No.: US 10,336,369 B2
(45) Date of Patent: Jul. 2, 2019

(54) VEHICLE FRONT BODY STRUCTURE

(71) Applicant: ArcelorMittal, Luxembourg (LU)

(72) Inventors: Ivan Viaux, Paris (FR); Sylvie Ditner, Paris (FR); Florent Allaire, La Rue Saint Pierre (FR)

(73) Assignee: ArcelorMittal, Luxembourg (LU)

( * ) Notice: Subject to any disclaimer, the term of this patent is extended or adjusted under 35 U.S.C. 154(b) by 89 days.

(21) Appl. No.: 15/512,912

(22) PCT Filed: Sep. 22, 2014

(86) PCT No.: PCT/IB2014/064732
§ 371 (c)(1),
(2) Date: Mar. 21, 2017

(87) PCT Pub. No.: WO2016/046591
PCT Pub. Date: Mar. 31, 2016

(65) Prior Publication Data
US 2017/0247056 A1      Aug. 31, 2017

(51) Int. Cl.
*B60J 7/00*      (2006.01)
*B62D 21/02*      (2006.01)
(Continued)

(52) U.S. Cl.
CPC ........... *B62D 21/02* (2013.01); *B62D 21/152* (2013.01); *B62D 29/007* (2013.01)

(58) Field of Classification Search
CPC ....... G03G 21/181; G03G 2215/00987; B65H 19/102; B65H 2301/46078;
(Continued)

(56) References Cited

U.S. PATENT DOCUMENTS 6,354,627 B1 *    3/2002    Kasuga ................. B62D 21/00
                                                          280/781
7,144,074 B2 *    12/2006    Lee ...................... B62D 25/084
                                                          296/203.02
(Continued)

FOREIGN PATENT DOCUMENTS

EP            0825096           2/1998
EP            2617509 A1        7/2013
(Continued)

*Primary Examiner* — Kiran B Patel
(74) *Attorney, Agent, or Firm* — Davidson, Davidson & Kappel, LLC

(57) ABSTRACT

The vehicle front body structure (2) comprises an upper longitudinal beam (10, 12) and a reinforcing element (14, 16) for reinforcing the wheel casing of the vehicle, said reinforcing element (14, 16) extending in a longitudinal direction substantially parallel to the upper longitudinal beam (10, 12), said upper longitudinal beam (10, 12) comprising an attachment portion (40), comprising an attachment area for attaching a connecting element (8) joining the upper longitudinal beam (10, 12) to a lower beam (22, 24) of the vehicle. The vehicle front body structure (2) further comprises a linking element (18, 20) joining the reinforcing element (14, 16) and the upper longitudinal beam (10, 12). The linking element (18, 20) is attached to the attachment portion (40) of the upper longitudinal beam (10, 12).

18 Claims, 1 Drawing Sheet

(51) Int. Cl.
    *B62D 21/15*      (2006.01)
    *B62D 29/00*      (2006.01)
(58) Field of Classification Search
    CPC ............ C09J 2203/342; E21B 33/1277;
              E02D 29/16; E04B 1/68; E04B 1/6812;
              E04B 1/6813
    USPC .................................................. 296/193.09
    See application file for complete search history.

(56) References Cited

U.S. PATENT DOCUMENTS

| | | | | |
|---|---|---|---|---|
| 7,341,299 B1* | 3/2008 | Baccouche | .......... | B62D 21/152 296/203.02 |
| 7,503,603 B2 | 3/2009 | Braunbeck et al. | | |
| 7,850,227 B2* | 12/2010 | Tamakoshi | ............. | B62D 21/11 296/193.09 |
| 8,128,160 B2* | 3/2012 | Leanza | ................ | B62D 25/088 296/187.09 |
| 8,388,046 B2 | 3/2013 | Hutter et al. | | |
| 8,459,728 B2* | 6/2013 | Fujii | .................... | B62D 25/082 296/187.09 |
| 8,668,251 B2* | 3/2014 | Fujita | ................... | B62D 21/152 296/146.5 |
| 8,684,451 B1* | 4/2014 | Park | ....................... | B62D 25/08 296/203.02 |
| 8,720,983 B1 | 5/2014 | Edwards et al. | | |
| 8,789,875 B2* | 7/2014 | Kageyama | .......... | B62D 25/2018 29/897.2 |
| 8,789,877 B2* | 7/2014 | Ohnaka | ................ | B62D 21/152 296/187.09 |
| 8,857,902 B2* | 10/2014 | Sekiguchi | ............ | B62D 25/082 296/187.09 |
| 8,967,701 B2* | 3/2015 | Barbat | ................. | B62D 21/152 296/187.1 |
| 9,016,424 B2* | 4/2015 | Awano | ..................... | B62D 3/12 180/274 |
| 9,150,253 B2* | 10/2015 | Watanabe | ............... | B62D 21/11 |
| 9,233,719 B2* | 1/2016 | Shibata | ................. | B62D 25/082 |
| 9,539,968 B2* | 1/2017 | Nishida | ................. | B62D 21/152 |
| 9,610,980 B2* | 4/2017 | Nakauchi | ................ | B60R 19/24 |
| 9,650,073 B2 | 5/2017 | Kim et al. | | |
| 9,663,050 B2 | 5/2017 | Nishida | | |
| 9,676,417 B2* | 6/2017 | Yamada | .................. | B60R 19/24 |
| 9,725,122 B2* | 8/2017 | Kim | ........................ | B62D 21/09 |
| 9,868,467 B2* | 1/2018 | Sasaki | .................. | B62D 21/152 |
| 2003/0025358 A1* | 2/2003 | Taguchi | ................. | B62D 21/152 296/203.02 |
| 2004/0200659 A1* | 10/2004 | Miyasaka | .............. | B62D 21/152 180/312 |
| 2004/0244172 A1* | 12/2004 | Elliott | .................... | B62D 23/00 29/407.05 |
| 2005/0046165 A1 | 3/2005 | Gomi et al. | | |
| 2005/0146162 A1 | 7/2005 | Gerick et al. | | |
| 2005/0214096 A1* | 9/2005 | Zaluzec | ................. | B62D 23/00 411/104 |
| 2006/0284449 A1* | 12/2006 | Miyahara | ............... | B62D 21/11 296/204 |
| 2007/0176443 A1* | 8/2007 | Yasuhara | ................ | B60R 19/34 293/133 |
| 2008/0150326 A1* | 6/2008 | Maruyama | ........... | B62D 21/152 296/192 |
| 2008/0217961 A1* | 9/2008 | Lustiger | ................ | B62D 25/084 296/193.09 |
| 2009/0146455 A1* | 6/2009 | Honji | .................... | B62D 21/152 296/187.09 |
| 2009/0243336 A1* | 10/2009 | Honji | .................... | B62D 21/152 296/187.09 |
| 2010/0127531 A1* | 5/2010 | Yasuhara | .............. | B62D 21/152 296/187.09 |
| 2010/0259033 A1* | 10/2010 | Okabe | ..................... | B60R 19/34 280/734 |
| 2011/0031781 A1* | 2/2011 | Nishimura | ............. | B62D 25/04 296/187.12 |
| 2012/0086225 A1* | 4/2012 | Matsuura | ................ | B60R 19/34 293/132 |
| 2012/0153679 A1* | 6/2012 | Yasuhara | .............. | B62D 21/152 296/203.02 |
| 2012/0248820 A1* | 10/2012 | Yasui | ...................... | B60R 19/34 296/187.09 |
| 2013/0207417 A1* | 8/2013 | Kihara | .................... | B60R 19/34 296/187.09 |
| 2014/0147693 A1 | 5/2014 | Yasuyama et al. | | |
| 2014/0312654 A1* | 10/2014 | Komiya | ................. | B62D 21/11 296/187.09 |
| 2015/0101561 A1* | 4/2015 | Chung | ................. | F02M 35/161 123/198 E |
| 2015/0102636 A1* | 4/2015 | Cho | ....................... | B62D 25/08 296/187.09 |
| 2015/0274208 A1* | 10/2015 | Segawa | ................ | B62D 21/152 180/232 |
| 2016/0236718 A1* | 8/2016 | Tatsuwaki | ............ | B62D 21/155 |
| 2016/0368535 A1* | 12/2016 | Kim | ...................... | B62D 21/08 |
| 2017/0021866 A1* | 1/2017 | Kim | ...................... | B62D 25/082 |
| 2017/0057546 A1* | 3/2017 | Dressel | .................. | B62D 21/15 |
| 2017/0166258 A1* | 6/2017 | Kim | ...................... | B62D 27/023 |
| 2017/0183038 A1* | 6/2017 | Dressel | ................ | B62D 21/152 |
| 2018/0001934 A1* | 1/2018 | Vigil | ..................... | B62D 25/04 |
| 2018/0073822 A1* | 3/2018 | Garrisi | .................... | F28F 13/06 |

FOREIGN PATENT DOCUMENTS

| | | |
|---|---|---|
| EP | 2949549 A1 | 12/2015 |
| EP | 2982574 A1 | 2/2016 |
| JP | 2005247295 A | 9/2005 |
| JP | 2009096330 A | 5/2009 |
| JP | 2009101952 | 5/2009 |
| JP | 2009113541 | 5/2009 |
| JP | 2009166613 A | 7/2009 |
| JP | 2009171032 A | 7/2009 |
| JP | 2010076763 A | 4/2010 |
| JP | 2010137832 A | 6/2010 |
| JP | 2010167897 A | 8/2010 |
| RU | 2368527 C1 | 9/2009 |
| RU | 2468953 C1 | 12/2012 |
| WO | 2012036262 A1 | 3/2012 |
| WO | 2014003418 A | 1/2014 |
| WO | 2014115580 A1 | 7/2014 |

* cited by examiner

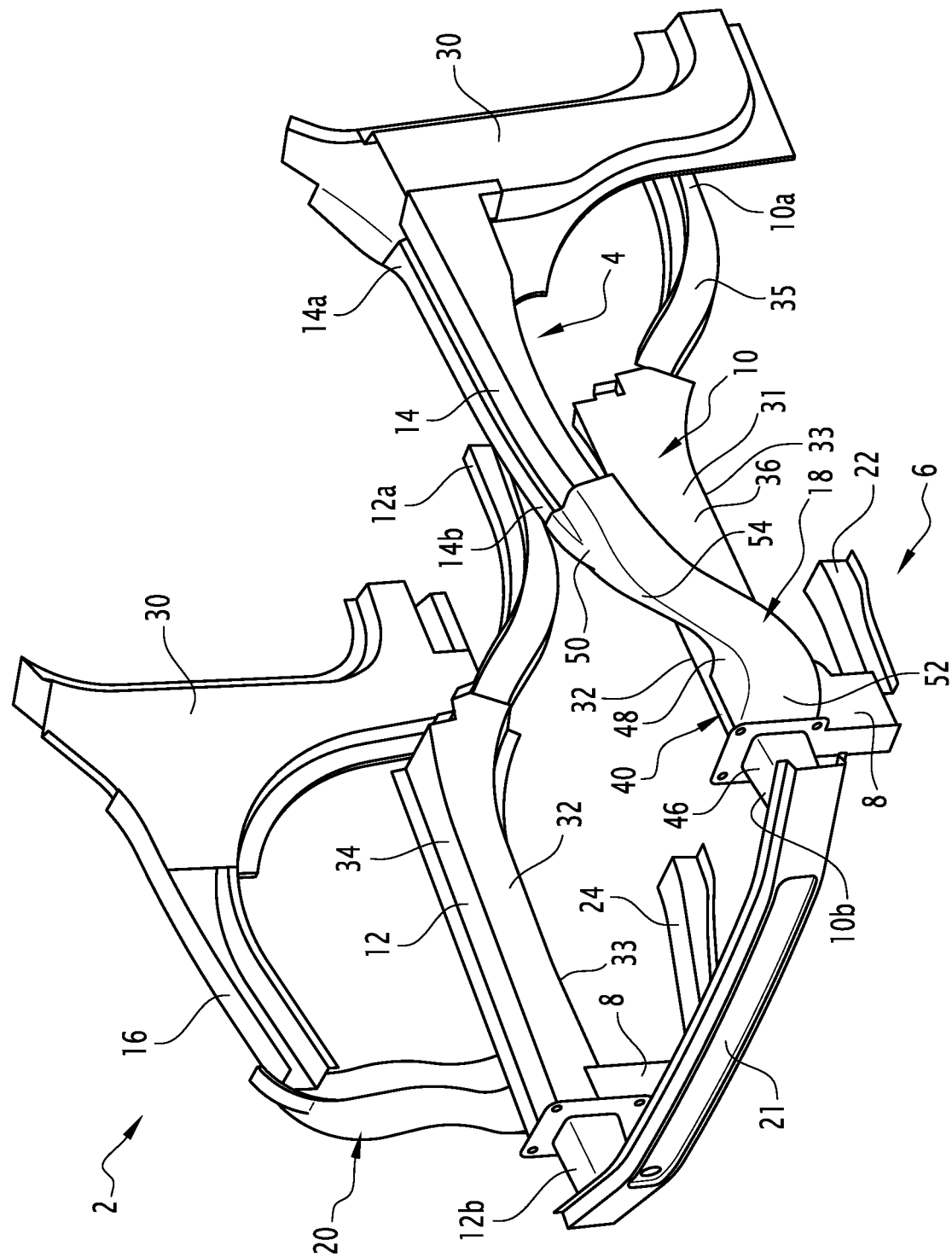

VEHICLE FRONT BODY STRUCTURE

The present invention concerns a vehicle front body structure comprising an upper longitudinal beam and a reinforcing element for reinforcing the wheel casing of the vehicle, said reinforcing element extending in a longitudinal direction substantially parallel to the upper longitudinal beam, said upper longitudinal beam comprising an attachment portion, comprising an attachment area for attaching a connecting element joining the upper longitudinal beam to a lower beam of the vehicle, the vehicle front body structure further comprising a linking element joining the reinforcing element and the upper longitudinal beam.

BACKGROUND OF THE INVENTION

Conventionally, a vehicle front body structure comprises longitudinal beams joined together by transversal beams, so as to define an engine room.

The longitudinal beams are designed so as to absorb impact energy during a frontal impact or a frontal impact with partial overlap, for example with a moderate overlap, of as low as 40%, i.e. such that only 40% of the vehicle front impacts an obstacle.

The vehicle front body structure generally further comprises longitudinal reinforcing elements extending above the front wheel casings, also called "shotgun" elements, designed to absorb impact energy during a frontal or oblique impact with little overlap, for example with less than 30% overlap.

In order to improve energy absorption, it was proposed to join longitudinal beams to the reinforcing elements, so that the longitudinal beams and the reinforcing elements may cooperate to absorb energy.

However, attaching the reinforcing elements to longitudinal beams results in a degraded energy absorption by the longitudinal beams, owing to the fact that this attachment impairs the ability of the longitudinal beams to deform. Therefore, even if the energy absorption capabilities of the vehicle front body structure during a frontal or oblique impact with little overlap may be improved, the energy absorption capabilities during a frontal impact with no or with moderate overlap are degraded.

SUMMARY OF THE INVENTION

One aim of the invention is to solve the aforementioned problems, in particular to provide a vehicle front body structure having in the same time an improved resistance to frontal or oblique impact with little overlap and an improved resistance to frontal impact with no or with moderate overlap.

To that end, the invention relates to a vehicle front body structure of the aforementioned type, wherein the linking element is attached to the attachment portion of the upper longitudinal beam.

Attaching the linking element to the attachment portion on which the connecting element is attached allows avoiding impairing the deformability of the upper longitudinal beam, and minimizing the portion of the upper longitudinal beam whose deformability is impaired. Therefore, the resistance to frontal or oblique impact with little overlap and the resistance to frontal impact are simultaneously improved.

According to other advantageous aspects of the invention, the vehicle front body structure comprises one or more of the following features, considered alone or according to any technically possible combination:

the upper longitudinal beam comprises an inner flank, an outer flank, parallel to the inner flank and a lower flank, substantially orthogonal to the inner and outer flanks, the attachment area extending on the lower flank and the linking element being attached to the outer flank next to the attachment area;

the linking element is made of steel, having a yield strength greater than or equal to 450 MPa;

the linking element is made of a dual phase steel;

the dual-phase steel has a tensile strength greater than or equal to 780 MPa;

the reinforcing element and the linking element are made of an integral part;

the linking element has an elbow shape having a first portion extending longitudinally from the reinforcing element and a second portion extending substantially perpendicularly between the first portion and the attachment portion of the upper longitudinal beam;

the linking element further comprises a joining portion joining the first portion to the second portion, said joining portion having an arcuate shape;

the joining portion extends forwards and downwards between the first portion and the second portion;

the vehicle front body structure further comprises a connecting element attached to the attachment area of the upper longitudinal beam, said connecting element joining the upper longitudinal beam to a lower beam of the vehicle;

the reinforcing element is a hollow tubular element;

the reinforcing element is formed by the assembly of at least two shelves, assembled together along a longitudinal plan;

the attachment portion of the upper longitudinal beam is substantially non-deformable and the upper longitudinal beam further comprises at least a portion substantially deformable by bundling, said substantially deformable portion being adjacent to the attachment portion;

the reinforcing element comprises a portion substantially deformable by bundling, adjacent to the linking element.

BRIEF DESCRIPTION OF THE DRAWINGS

Other features and advantages of the invention will be better understood from a reading of the following description, given with reference to the appended FIGURE, which is a perspective view of a vehicle front body structure according to a particular embodiment.

DETAILED DESCRIPTION

In the following description, the terms inner, outer, front, rear, transversal, longitudinal, vertical and horizontal are construed with reference to the usual orientation of the illustrated elements, parts or structures when assembled on a vehicle structure, the vehicle lying on a horizontal plane.

A vehicle front body structure 2 according to an embodiment is illustrated on the Figure. The vehicle front body structure may be a front body structure of any kind of four wheel vehicles, in particular a front body structure of a unitized body.

The vehicle front body structure 2 comprises an upper frame assembly 4, a lower frame assembly 6, and connecting elements 8 for joining the upper frame assembly 4 and the lower frame assembly 6.

The upper frame assembly 4 comprises two upper longitudinal beams 10, 12, two reinforcing elements 14, 16, and two linking elements 18, 20 each joining a reinforcing element 14, 16 to an upper longitudinal beam 10, 12. The upper frame assembly 4 further comprises a transversal beam 21, forming a bumper.

The lower frame assembly 6 comprises two lower longitudinal beams 22, 24. The lower longitudinal beams 22, 24 are for example cradle extensions.

The upper longitudinal beams 10, 12, the reinforcing elements 14, 16 and the linking elements 18, 20 are all provided as pairs in left-right symmetry with respect to the lateral direction. In the following, the description will be made with reference to the left side elements or beams, on the understanding that the same description applies to the right side elements or beams.

The upper longitudinal beam 10 extends on one side of the vehicle in a front-rear direction of the vehicle body.

The upper longitudinal beam 10 extends between a rear end 10a and a front end 10b. Similarly, the upper longitudinal beam 12 extends between a rear end 12a and a front end 12b The rear end 10a is fixed to a portion of the vehicle structure, for example the front pillar 30, or other body structure fixed to the front pillar. Such a connection allows impact energy to be transferred through the longitudinal beam 10 to the remainder of the vehicle.

The transversal beam 21 extends in a substantially transversal direction between the upper longitudinal beams 10 and 12. The transversal beam 21 is attached to the front ends 10b, 12b of the upper longitudinal beams 10 and 12.

The upper longitudinal beam 10 comprise an outer flank 31, oriented towards the exterior of the vehicle, and an inner flank 32, parallel to the outer flank 31, oriented towards the interior of the vehicle. The upper longitudinal beam 10 further comprises a lower flank 33 oriented towards the bottom of the vehicle and an upper flank 34 oriented towards the top of the vehicle, the lower and upper flanks 33, 34 being substantially orthogonal to the inner and outer flanks 31, 32.

The upper longitudinal beam 10 comprises, from the rear end 10a to the front end 10b, a curved rear part 35 extending upward towards the front of the vehicle, and a substantially horizontal front part 36. The front part 36 includes an attachment portion 40. The attachment portion 40 comprises a first attachment area for attaching a connecting element 8, destined to join the upper longitudinal beam 10 to the lower longitudinal beam 22, and a second attachment area for attaching the linking element 18.

The first and second attachment areas are for example placed next to each other on the attachment portion 40. In the illustrated example, the first attachment area extends on the lower flank 33 of the upper longitudinal beam 10, and the second attachment area extends on the outer flank 31, next to the first attachment area, so that the first and second attachment areas are contiguous.

Alternatively, the attachment areas are placed opposite to each other on the attachment portion 40, the first attachment area extending on the inner flank 32 of the upper longitudinal beam 10, and the second attachment area extending on the outer flank 31, opposite to the first attachment area.

Preferably, the attachment portion 40 is an intermediate portion of the upper longitudinal beam 10. Thus, the longitudinal beam 10 comprises, within the front part 36, a front portion 46, a rear portion 48 and the attachment portion 40, such that the attachment portion 40 is comprised between the front portion 46 and the rear portion 48.

The upper longitudinal beam 10 is for example made of a deformable material, for example a TRIP steel (TRansformation Induced Plasticity), preferably having a tensile strength higher than or equal to 780 MPa, or a high strength low alloy (so called HSLA) steel.

In particular, the upper longitudinal beam 10 may deform by bundling, i.e. by folding in on itself like a plastics bottle, when subjected to compressive stress resulting from an impact.

However, when the connecting element 8 and the linking element 18 are attached to the attachment portion 40, the bundling of the attachment portion 40 is impaired, so that the attachment portion 40 is substantially non-deformable.

However, owing to the fact that the connecting element 8 and the linking element 18 are attached to the same attachment portion 40 of the upper longitudinal beam 10, the upper longitudinal beam 10 comprises a single substantially non-deformable portion.

Indeed, the deformability of the attachment portion 40 is impaired by the attachment of the connecting element 8 alone, and attaching the linking element 18 to the same attachment portion 40 does not significantly further impair the deformability of the upper longitudinal beam 10.

The front and the rear portions 46, 48 remain deformable, in particular by bundling, so that the upper longitudinal beams 10, 12 are able to absorb an important quantity of energy before fracture.

The front and the rear portions 46, 48 may comprise crumple zones to allow the upper longitudinal beams 10, 12 to controllably deform during an impact. The crumple zones may include, for example, apartures or cavities formed on the surface of the portions.

The reinforcing element 14 extends in a longitudinal direction substantially parallel to the upper longitudinal beam 10, on the lateral outer side of the upper longitudinal beam 10, and above the upper longitudinal beam 10.

The reinforcing element 14, also called "shotgun rail", is destined to reinforce the wheel casing of the vehicle, in particular during a frontal impact with partial overlap.

The reinforcing element 14 thus extends substantially above the front wheel casing of the vehicle body.

The reinforcing element 14 extends between a rear end 14a and a front end 14b. The rear end 14a is fixed to a portion of the vehicle structure, for example the front pillar 30. The rear end 14a may however be fixed to an other body structure fixed to the front pillar 30. Such a connection allows an impact energy to be transferred through the reinforcing element 14 to the remainder of the vehicle.

Preferably, part of or the whole reinforcing element 14 has a tubular shape, with a hollow closed cross-section, such as a square tube, a rectangular tube or a round tube.

The reinforcing element 14 may be formed by an extruding process, hydro-forming process, or by fixing two or more open section elements together, for example along longitudinal planes, so that the form a close section. For example, the reinforcing element 14 is formed by the assembly of two half shelves, assembled together along a longitudinal plane.

The reinforcing element 14 is made of steel. Preferably, the steel forming the reinforcing element 14 has both a good ductility and a high yield strength, so that the reinforcing element 14 may deform and absorb a significant quantity of energy before fracture.

For example, the reinforcing element 14 is made of a dual-phase steel.

The dual-phase steel has for example a yield to tensile strength ratio inferior to 0.6, preferably inferior to 0.5.

For example, the reinforcing element 14 is made of a dual-phase steel having a tensile strength greater than or equal to 780 MPa. For example, the dual-phase steel has a yield strength comprised between 450 MPa and 600 MPa.

The reinforcing element 14 may comprise crumple zones to allow the reinforcing element 14 to controllably deform during an impact. The crumple zones may include, for example, apartures or cavities formed on the surface of the portions.

The linking element 18 joins the reinforcing element 14 and the upper longitudinal beam 10.

In particular, the linking element 18 joins the front end 14b of the reinforcing element 14 to the attachment portion 40 of the upper longitudinal beam 10.

The linking element 18 protrudes from the front end 14b of the reinforcing element 14 and is attached to the second attachment area of the attachment portion 40, preferably by welding, for example by gas metal arc welding (GMAW).

Owing to the attachment the reinforcing element 14 to the upper longitudinal beam 10 by means of the linking element 18, the reinforcing element 14 and the upper longitudinal beam 10 may cooperate to absorb energy during an impact, even if only one of the reinforcing element 14 and the upper longitudinal beam 10 is impacted.

The linking element 18 generally extends forwards and downwards from the reinforcing element 14 to the upper longitudinal beam 10

Preferably, the linking element 18 has an elbow shape. The linking element 18 has a first portion 50 extending longitudinally from the reinforcement element 14, a second portion 52 extending substantially perpendicularly between the first portion 50 and the attachment portion 40, and a joining portion 54 joining the first portion 50 to the second portion 52. The joining portion 54 extends forwards and downwards from the first portion 50 to the second portion 52.

Preferably, the joining portion 54 has an arcuate shape.

Such an arcuate shape improves the transmission of impact energy between the reinforcing element 14 and the upper longitudinal beam 10.

Preferably, part of or the whole linking element 18 has a hollow closed cross-section.

The linking element 18 may be formed by an extruding process, hydro-forming process, or by fixing two or more open section elements together, for example along longitudinal planes, so that the form a close section. For example, the linking element 18 is formed by the assembly of two half shelves, assembled together along a longitudinal plane.

The linking element 18 is made of steel. Preferably, the steel forming the linking element 18 has both a good ductility and a high yield strength, so that the linking element 18 may absorb a significant quantity of energy before fracture.

For example, the linking element 18 is made of a dual-phase steel.

The dual-phase steel has a yield to tensile strength ratio inferior to 0.6, preferably inferior to 0.5.

For example, the linking element 18 is made of a dual-phase steel having a tensile strength comprised greater than or equal to 780 MPa.

Preferably, the linking element 18 and the reinforcing element 14 are made of the same steel.

Preferably, the linking element 18 and the reinforcing element 14 are made of an integral part, i.e. such that at least part of the linking element 18 and at least part of the reinforcing element 14 are made of a single integral piece.

In this case, the production of the linking element 18 and the reinforcing element 14 are indivisible, i.e. the production of the linking element 18 inevitably results in the production of the reinforcing element 14.

For example, if the linking element 18 and the reinforcing element 14 are formed by an extruding process or a hydro-forming process, the linking element 18 and the reinforcing element 14 may be made of an integral single part.

If the linking element 18 and the reinforcing element 14 are formed by fixing two or more open section elements together, each of the section elements is common to the linking element 18 and the reinforcing element 14.

The connecting element 8 joins the upper longitudinal beam 10 to the lower longitudinal beam 22, and supports the lower longitudinal beam 22. The connecting element 8 extends in a substantially vertical direction between the upper longitudinal beam 10 and the lower longitudinal beam 22.

The connecting element 8 comprises an upper end attached to the first attachment area 42 of the upper longitudinal beam 10, for example by welding. The connecting element further comprises a lower end attached to the lower longitudinal beam 22.

While the invention has been described in detail in connection with only a limited number of embodiments, it should be readily understood that the invention is not limited to such disclosed embodiments.

For example, even if only the upper and lower longitudinal beams, the reinforcing elements, the connecting elements and the lower transversal beam were described and illustrated, the vehicle front body structures may comprise several other beams or elements.

What is claimed is:

1. A front body structure of a vehicle, the front body structure comprising:
    an upper longitudinal beam, the upper longitudinal beam comprising an attachment portion, including an attachment area;
    a lower beam;
    a reinforcement for reinforcing a wheel casing of the vehicle, the reinforcement extending in a longitudinal direction parallel to the upper longitudinal beam, on a lateral outer side of the upper longitudinal beam and above the upper longitudinal beam;
    a link joining the reinforcement to the upper longitudinal beam,
    wherein the link protrudes from a front end of the reinforcement and extends forwards and downwards from the reinforcement to the upper longitudinal beam,
    the link is attached to the attachment portion of the upper longitudinal beam; and
    a connector attached to the attachment area of the upper longitudinal beam, the connector joining the upper longitudinal beam to the lower beam, the connector extending between an upper end attached to the first attachment area of the upper longitudinal beam and a lower end attached to the lower beam.

2. The vehicle front body structure as recited in claim 1 wherein the upper longitudinal beam comprises an inner flank, an outer flank parallel to the inner flank, and a lower flank, orthogonal to the inner and outer flanks, the attachment area extending on the lower flank, and the link being attached to the outer flank next to the attachment area.

3. The vehicle front body structure as recited in claim 1 wherein the link is made of steel, having a yield strength greater than or equal to 450 MPa.

4. The vehicle front body structure as recited in claim 1 wherein the link is made of a dual phase steel.

5. The vehicle front body structure as recited in claim 4 wherein the dual-phase steel has a tensile strength greater than or equal to 780 MPa.

6. The vehicle front body structure as recited in claim 1 wherein the reinforcement and the link are made of an integral part.

7. The vehicle front body structure as recited in claim 1 wherein the link has an elbow shape having a first portion extending longitudinally from the reinforcement and a second portion extending perpendicularly between the first portion and the attachment portion of the upper longitudinal beam.

8. The vehicle front body structure as recited in claim 7 wherein the link further comprises a joining portion joining the first portion to the second portion, the joining portion having an arcuate shape.

9. The vehicle front body structure as recited in claim 8 wherein the joining portion extends forwards and downwards between the first portion and the second portion.

10. The vehicle front body structure as recited in claim 1 wherein the reinforcement is a hollow tubular element.

11. The vehicle front body structure as recited in claim 10 wherein the reinforcement is formed by an assembly of at least two shelves, assembled together along a longitudinal plan.

12. The vehicle front body structure as recited in claim 1 wherein the attachment portion of the upper longitudinal beam is non-deformable and wherein the upper longitudinal beam further comprises at least a portion deformable by bundling, the deformable portion being adjacent to the attachment portion.

13. The vehicle front body structure as recited in claim 1 wherein the reinforcement comprises a portion deformable by bundling, adjacent to the link.

14. The vehicle front body structure as recited in claim 1 wherein the attachment portion of the upper longitudinal beam comprises a further attachment area, the link being attached to the further attachment area, the attachment area and the further attachment area being contiguous to each other on the upper longitudinal beam.

15. The vehicle front body structure as recited in claim 1 wherein the upper longitudinal beam comprises a single substantially non-deformable portion, the single non-deformable portion consisting of the attachment portion.

16. The vehicle front body structure as recited in claim 1, wherein the upper longitudinal beam comprises a front portion, a rear portion and the attachment portion, such that the attachment portion is comprised between the front portion and the rear portion.

17. The vehicle front body structure as recited in claim 16, wherein the attachment portion is non-deformable, and the front and the rear portions are deformable by bundling.

18. The vehicle front body structure as recited in claim 1 wherein the link is attached by welding to the upper longitudinal beam.

* * * * *